United States Patent [19]

Fischer

[11] Patent Number: 4,801,085
[45] Date of Patent: Jan. 31, 1989

[54] DUAL AUGER MANURE SPREADER

[75] Inventor: Thomas R. Fischer, Wapakoneta, Ohio

[73] Assignee: Allied Products Corporation, Chicago, Ill.

[21] Appl. No.: 68,234

[22] Filed: Jun. 30, 1987

[51] Int. Cl.⁴ .............................................. A01C 19/02
[52] U.S. Cl. .................................... 239/1; 239/675; 414/310; 414/320; 198/661
[58] Field of Search ............... 239/7, 675, 662, 672; 414/310, 326, 319–321, 526; 198/661, 667

[56] References Cited

U.S. PATENT DOCUMENTS

| | | |
|---|---|---|
| 2,891,655 | 6/1959 | Saiberlich ................ 239/675 X |
| 3,206,215 | 9/1965 | De Jong . |
| 3,508,683 | 4/1970 | van der Schee ................ 222/55 |
| 3,605,995 | 9/1971 | Maack . |
| 3,851,804 | 12/1974 | Fyrk ................ 239/675 X |
| 3,997,118 | 12/1976 | Bedovell et al. ................ 239/675 X |
| 4,078,729 | 3/1978 | Foltz . |
| 4,124,166 | 11/1978 | Lucas ................ 239/662 |
| 4,362,272 | 12/1982 | Martin ................ 239/7 |
| 4,377,364 | 3/1983 | Weaver ................ 414/307 |
| 4,467,967 | 8/1984 | Martin ................ 239/662 |
| 4,473,184 | 9/1984 | Martin ................ 239/7 |
| 4,475,692 | 10/1984 | Walley ................ 239/662 |
| 4,479,608 | 10/1984 | Martin ................ 239/7 |
| 4,522,296 | 6/1985 | Rieke ................ 198/548 |

FOREIGN PATENT DOCUMENTS

| | | | |
|---|---|---|---|
| 151567 | 6/1948 | Australia ................ 239/675 |
| 989895 | 5/1976 | Canada . | |
| 47285 | 2/1977 | Japan ................ 222/412 |
| 204851 | 12/1965 | Sweden . | |
| 2157142 | 10/1985 | United Kingdom ................ 239/675 |

Primary Examiner—Andres Kashnikow
Assistant Examiner—Kevin P. Weldon
Attorney, Agent, or Firm—Lockwood, Alex, Fitzgibbon & Cummings

[57] ABSTRACT

A manure spreader device and method of distributing any of a variety of manure materials having varying consistencies are provided. The device and method embody a concept in which a plurality of elongated augers that are longitudinally positioned within a translatable bin impart a stepped characteristic to the flow of manure material in order to loosen the manure material, if necessary, prior to its passage into a generally vertically oriented expeller assembly.

24 Claims, 5 Drawing Sheets

Fig. 4

DUAL AUGER MANURE SPREADER

DESCRIPTION

BACKGROUND OF THE INVENTION

The present invention generally relates to a manure spreading apparatus and method which incorporate the use of dual longitudinal augers that feed most types of manure into a vertically oriented expeller in order to thereby throw the manure onto an agricultural field or the like. The invention more particularly relates to feeding manure along an elongated auger assembly having a relatively shallow flight profile and to a feed portion of the auger assembly having a relatively deep flight profile for feeding the manure into the expeller. The manure spreader is typically of the type that is pulled by a tractor or the like and that is run from the power take-off (PTO) thereof.

In the field of manure spreading, two objectives have been sought but have been found to be difficult to attain. One of these objectives is to provide manure spreaders and manure spreading procedures that are as versatile as possible, especially regarding the types of manure that can be spread. More specifically, manures vary in composition from those that are predominantly liquid to those that are predominantly semi-solid or solids containing. Furthermore, certain manures have an especially sticky consistency, and they tend to adhere to manure spreader components and surfaces. Manures can also contain fibrous plant and vegetable waste material and debris. Specific debris can include stones, straw and the like. Manures can be characterized as varying in composition from that of a watery slurry to that of a semi-solid mixture. It is desirable that a manure spreader be able to handle any of these types of manures and to have the ability to distribute same evenly across an agricultural field or the like.

Another principal objective of manure spreading is to avoid the difficulty of having the mechanisms become clogged during use and to avoid the somewhat related difficulty of experiencing bridging which is an especially troublesome problem for manures that have a sticky consistency. Such manures tend to clump into a large solid mass that cannot be readily fed by the manure spreader without breaking up the clump or bridge. In the case of manure spreaders having a longitudinal auger near the bottom of the bed of the device, the manure can bridge between the upstanding walls of the device to the extent that the flow of manure into the auger is severely restricted or prevented. Previous attempts to solve this problem have included movement of the auger into the bridged manure in an attempt to break up the bridge.

These objectives are achieved, and these problems are brought under control, by utilizing the apparatus according to the present invention which is capable of handling wide varieties of manures. The invention addresses itself to the bridging problem by an approach that is directed toward substantially preventing the formation of bridges, rather than one which seeks to break bridges that have already been formed or have been partially formed.

SUMMARY OF THE INVENTION

The manure spreader according to the present invention includes dual, side-by-side augers positioned within and at the bottom of a manure spreader bin having a wide-mouth overall configuration, with the augers being positioned for moving the manure generally forwardly within the bottom portion of the open-mouth orientation. Each auger has at least two distinct flight profiles. A portion of the auger, typically running for the greater portion of the length of the auger, exhibits substantially shallow auger flights positioned on a shaft that is broad in cross-section. The feed end of each auger exhibits a more aggressive profile, one that includes relatively deep flights and a shaft of reduced cross-sectional size. In this manner, the manure is fed toward the feed end and the feed power is increased at the location of the auger profile having deep flighting. An expeller assembly that is vertically oriented and positioned generally perpendicularly with respect to the dual augers is closely spaced from the feed-end edges of the augers and receives the manure from the auger profiles having deep flighting. The expeller assembly receives the manure and expels it in a generally broad pattern from a side of the manure spreader.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENTS

Figure 1:
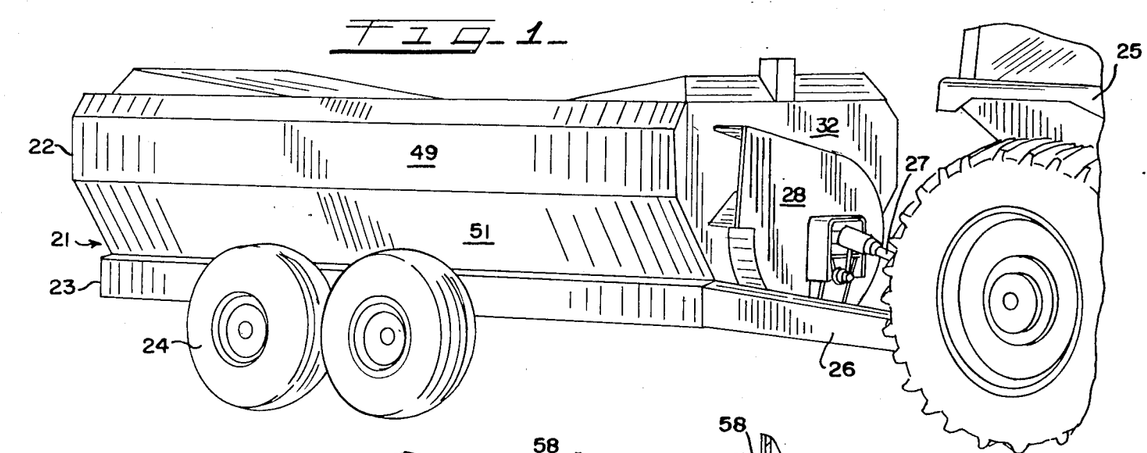
FIG. 1 is a perspective view of a preferred embodiment of the manure spreader, shown in driven communication with a pulling vehicle.
Figure 2:
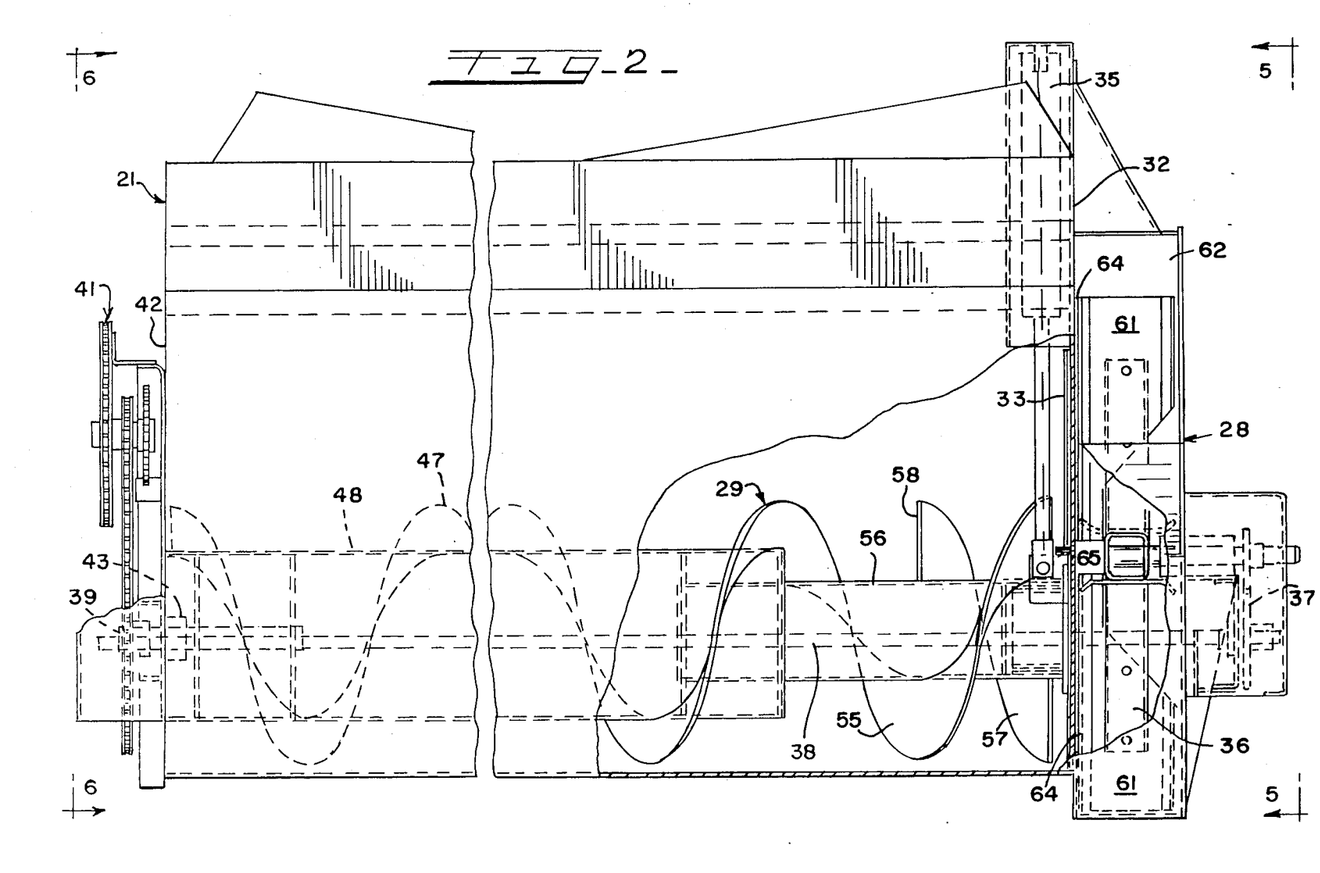
FIG. 2 is a side elevational view, partially broken away, of the device shown in FIG. 1.

A manure spreader, generally designated as 21 in FIG. 1, includes a bin 22 mounted onto a frame 23 having ground-engaging wheels 24. A pulling vehicle 25 such as a tractor is shown in pulling and driving engagement with the manure spreader 21 through a tongue 26 and a drive shaft 27 in communication with the PTO of the pulling vehicle 25. With particular reference to FIG. 2, the manure spreader 21 includes a generally vertically oriented expeller assembly, generally designated as 28, and at least two auger assemblies that are longitudinally oriented within the bin 22 and that feed manure material or the like into the expeller assembly 28. Auger assemblies 29 and the expeller assembly 28 communicate through an opening 31 in front end wall 32 that is selectively opened and closed by a gate 33 which is typically vertically slidably mounted within a gate track 34. Gate 33 may be suitably operated by a device such as the illustrated piston and cylinder assembly 35.

Expeller assembly 2 is typically directly driven from the drive shaft 27 in order to impart a relatively fast angular velocity to a vertically oriented fan assembly 36 within the expeller assembly 28. A chain and sprocket assembly 37 transmits the rotational energy of the drive shaft 27 to an elongated drive shaft 38 that terminates in a drive sprocket 39 at the rear of the bin 22. Rear drive sprocket 39 drives a chain and sprocket arrangement, generally designated as 41, which reduces the rotational speed of the rear drive sprocket 39 in order to effect rotation of the auger assemblies 29 at a speed slower than that of the PTO and of the fan assembly 36 of the expeller assembly 28. If desired, the chain and sprocket arrangement 41 can provide an output of more than one speed in order to permit the user to select, for example, between a speed of 12 rpm and a speed of 9 rpm, while the speed of a PTO drive is usually on the order of 540 rpm. Typically, the chain and sprocket arrangement 41 is mounted on the rear end wall 42 of the bin 22. Friction-type slip clutches or the like can be interposed along the drive train.

Each auger assembly 29 is mounted to the rear end wall 42 by a bearing assembly 43 of generally known construction. Each auger assembly 29 is rotatably mounted to front end wall 32 by a suitable arrangement. The preferred arrangement is explicitly illustrated in FIG. 3. A metal sleeve 44 of generally cylindrical configuration is bolted or otherwise secured to the end wall 32. The front or feed end of the auger assembly 29 includes a cylindrical box 45 that has an inside cylindrical surface somewhat larger than the outside cylindrical surface of the metal sleeve 44. Positioned in between the outer surface of the metal sleeve 44 and the inner surface of the cylindrical box 45 is a cylindrical bearing member 46 that is made of a durable and somewhat lubricious material, typically a polymeric material such as polyurethane, polyethylene or the like. This structure provides a low-friction and high-strength rotational mount for the front end of each auger assembly 29.

Each auger assembly 29 includes at least two different auger profiles. One auger profile includes relatively shallow auger flights 47 mounted over shafts 48 that have a large or broad cross-section, the illustrated shafts 48 having a large outer diameter that is substantially the same as the nominal inner diameter of the shallow auger flights 47. This combination provides an elongated counter-rotating dual auger arrangement that substantially uniformly moves various types of manure materials forwardly within the bin 22, such feed commencing near the rear end of the dual auger assemblies in order to provide a flow of material from the rear of the bin 22, downwardly into the dual augers, and forwardly therealong toward the front end wall 32. This type of feed flow is assisted by sidewalls that include substantially vertical wall portions 49 and relatively steep inwardly sloping wall portions 51 which cooperate to provide a wide-mouth access for the manure to the dual auger assemblies 29.

The effectiveness of the dual auger feed arrangement can be further enhanced by including an elongated spacer ridge 52 that assists in the task of having the auger flights move the manure material forwardly. This task is further assisted by the generally arcuate sidewall bottom panels 53 which join the inwardly sloping wall portions 51 with the bottom wall 54. Accordingly, the bin 22 can be thus provided with a generally w-shaped configuration. When in use, the manure material can be heaped high within the bin 22, and it begins to sink into the rear of the counter-rotating auger flights.

Each auger assembly 29 further includes deep auger flights 55 at the feed end portion of the auger assembly 29. Deep auger flights 55 have a profile that is substantially greater in its radial extent than are the shallow auger flights 47. This deep auger profile includes a feed end auger shaft portion 56 that has a substantially smaller cross-section than does the auger shaft portion 48 that is upstream of the feed end auger shaft portion 56.

This combination of deep auger flights 55 downstream of shallower auger flights 47 achieves a stepped feed procedure which effects an aggressive and consistent feed of the manure into the expeller assembly 28. More particularly, movement of the manure material from the shallow auger flights 47 to the deep auger flights 55 increases the unit volume available for units of manure material being fed along the dual auger assembly. This loosens the manure material by permitting spaces to form therebetween as same falls into the deep auger flights and moves therealong. Packed and/or congested volumes of manure are spread.

In addition, providing the reduced size feed end auger shaft portion develops a larger area of transfer between the dual augers and the expeller assembly 28. Because of the preferred counter-rotating dual auger arrangement and the looseness of the manure material when it exits from the auger assemblies 29, the manure is "cammed" into the fan assembly 36 of the expeller assembly 28, allowing the fan assembly 36 to more efficiently direct and expel a broken flow of manure material and minimize the need for the fan assembly 36 to itself shear or break up the manure flow. Also, because of the advantageous feed pattern provided by the stepped feed, counter-rotating dual auger concept of the present invention, the feed rate of manure material through the machine is substantially increased. For example, a manure spreader having a v-shaped bin, a single, non-stepped longitudinal auger, and a side-throwing expeller typically can feed a semi-solid manure material out of its bin in approximately five minutes, whereas the same type of semi-solid manure material can be fed out of a manure spreader according to the present invention and having a bin of substantially the same size in about three minutes.

The feeding efficiency and aggressiveness of the dual auger assembly according to the present invention is enhanced by including a secondary deep auger flight 57 at the feed end of the deep auger flights 55 and located 180° therefrom along the shaft portion 56. Such a secondary deep auger flight 57 increases the feeding work performed by the dual auger configuration at the location where the manure material is transferred into the fan assembly 36. This increases, the feed aggressiveness of the device. Preferably, an edge means or gusset 58 is provided at the free end of each of the auger flights in order to increase the strength of such free ends.

Figure 3:
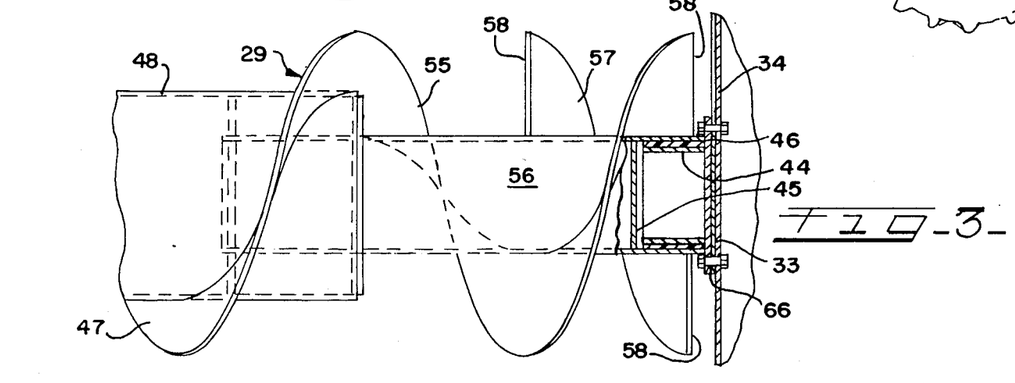
FIG. 3 is a detail, side elevational view of a portion of FIG. 2, partially in cross-section.
Figure 4:
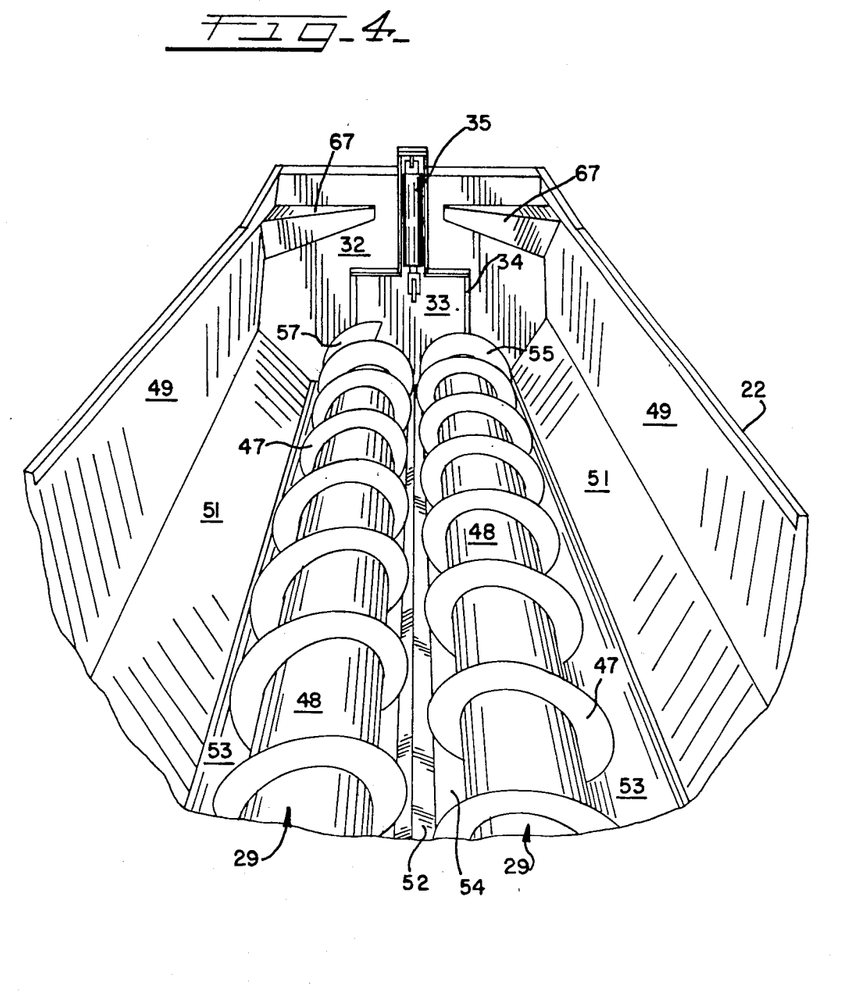
FIG. 4 is a perspective view of a portion of an embodiment of the device illustrated in FIG. 1, with the rear end thereof being broken away.

More than a single step in the depth profile of the auger flights could be provided, and the steps could incorporate shafts that taper along their respective lengths. It is believed to be advantageous to provide a somewhat abrupt or precipitous step such as that illustrated in FIGS. 2 and 3 whereby the manure material can be loosened by virtue of its falling down the step between the wide auger shaft 48 and the narrow auger shaft 56. From the point of view of ease of manufacturing, it is preferred to have the outwardly extending radial profile of the deep auger flights 55 to be continuous with the outwardly extending outer profile of the shallow auger flights 47, as is illustrated in FIGS. 2, 3 and 4.

Figure 5:
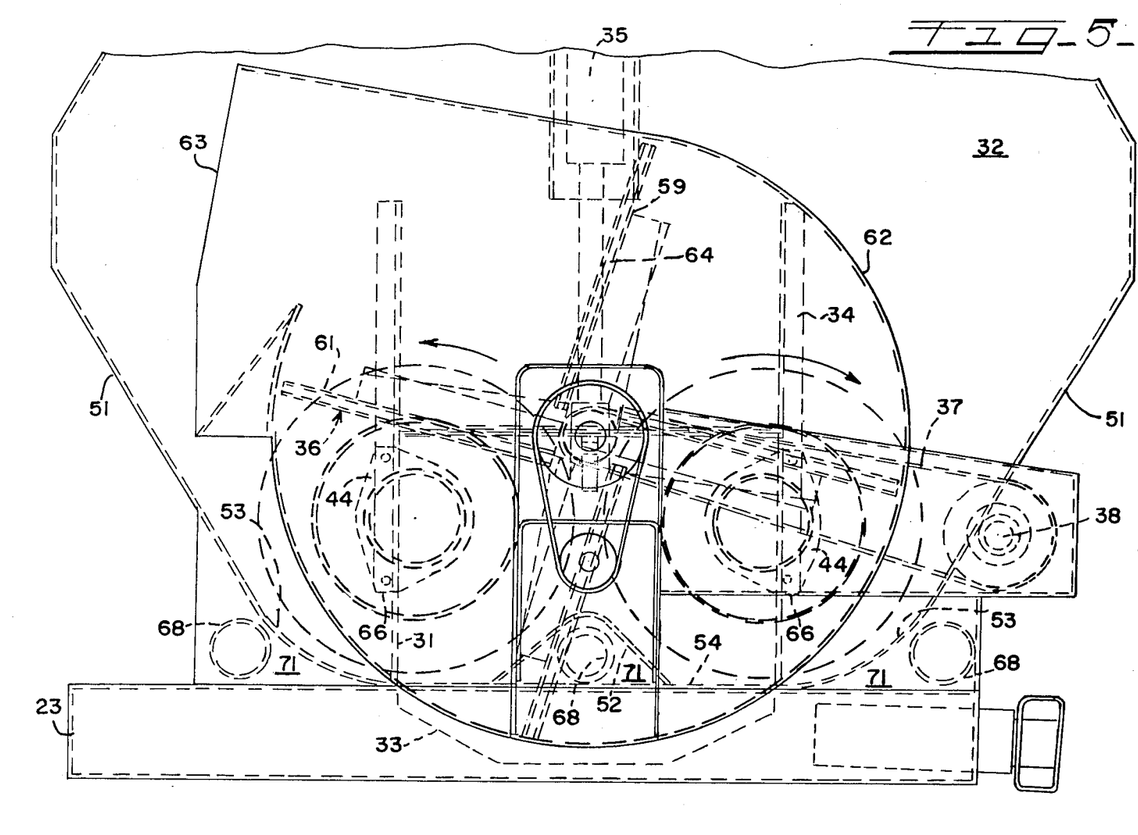
FIG. 5 is a front end elevational view taken along the line 5—5 of FIG. 2 and also illustrating a preferred auger assembly counter-rotation arrangement.

With more specific reference to the direction of rotation of the dual augers, it is preferred that the auger assemblies 29 rotate in different directions, that is counter-rotate. They may rotate generally toward each other so that the manure material tends to be moved generally between the auger assemblies 29. This arrangement is illustrated in FIG. 4. It is especially preferred that the counter-rotation be generally away from each other so that the manure material tends to be moved generally toward the sidewalls of the bin 22. Such cooperates with the other features of the invention in order to even more effectively break up the manure material, thereby facilitating its passage to, into and through the expeller assembly 28. The rotational direction of the augers for this especially preferred arrangement is illustrated in FIG. 5. In this instance, the pitch of the auger flights is oriented in an angular direction generally the reverse of that shown in FIG. 4. A suitable exemplary arrangement in this regard is effected by interchanging the two dual auger assemblies for each other such that the auger assembly shown on the right in FIG. 4 is exchanged with the one shown on the left.

The embodiments illustrated in the drawings feeds the manure toward the front of the device. A rear feed would also be suitable, although a front feed device is more easily designed to give superior rear ground clearance. Also, a front feed machine can be more easily kept in balance to ensure satisfactory hitching and travel attributes since, as the manure unloads, the manure weight is constantly being directed toward the front of the device.

Referring more particularly to the expeller assembly 28, its fan assembly 36 includes a plurality of rigidly mounted blades 59, four such blades being shown in the drawings, for example in FIG. 5. Each paddle blade 59 includes a longitudinally or axially extending face 61 (FIG. 2) that receives the manure material from the deep, dual auger flights and moves the material within housing 62 of expeller assembly 28 in a counterclockwise direction as viewed in FIG. 5 and throws same out of the open mouth 63 of the housing 62. Each paddle blade 59 preferably also includes a transverse or radially extending lip 64 in order to enhance the strength and aggressiveness of each paddle blade 59 at the location where it first engages the manure material being fed thereinto by the deep auger flights. The paddle blades 59 overlap a center plate 65 of the fan assembly 36 in order to prevent the build-up of manure material around the center plate 65 and in order to increase the working area of the fan assembly 36 that receives manure material from the dual auger assembly. Paddle blades 59 preferably are sized and positioned such that each sweeps the entire opening 31 within the front end wall 32.

This area of transfer between the fan assembly 36 and the feed end of dual auger assembly is substantially defined by the size of the opening 31 and the extent that the gate 33 is open. It is typically advantageous that this opening 31 be as wide and as unobstructed as possible. One obstruction that can be minimized is the gate track 34 which preferably terminates as far as possible above the bottom wall 54 of the bin 22, the bottom edge 66 of the gate track 34 being illustrated in FIGS. 3 and 5. Concerning the objective of providing a large opening 31, the opening cannot be so large as to provide a front end wall 32 that does not have the strength needed to withstand the pressure of manure within the bin. Increasing the area of the front end wall 32 that can be taken up by the opening 31 is assisted by providing means such as the illustrated braces 67 which add strength to the front end wall 32 while minimizing interference with the feed of manure within the device.

Figure 6:
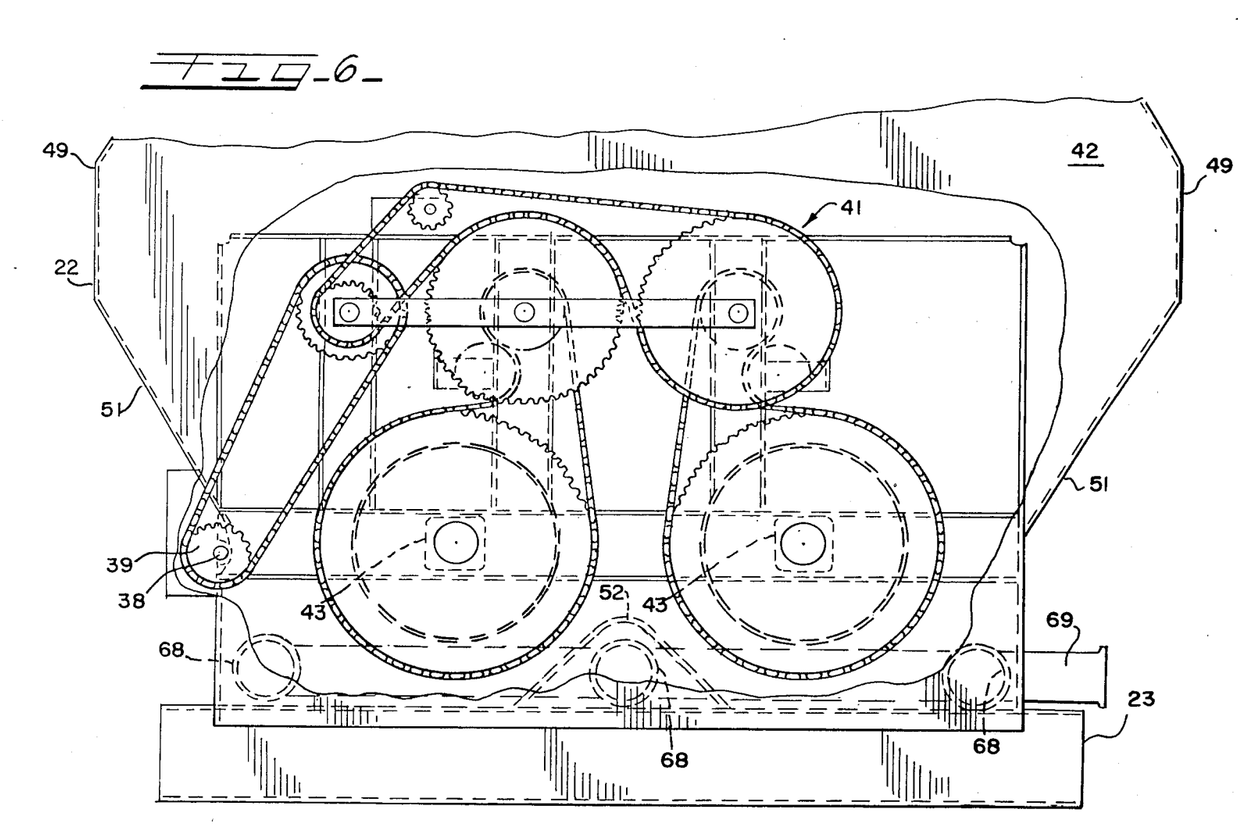
FIG. 6 is a rear end elevational view taken along the line 6—6 of FIG. 2, with a portion of the protective covering thereover being broken away.

When manure spreaders are used under freezing environmental conditions, manure material sometimes freezes within the bin. This situation is addressed by heating means that can be incorporated into the device of the present invention. In one embodiment, one or more heater tubes 68 can be positioned longitudinally on the frame 23 in order to receive a supply of heat, such as a hot air feed from a known heating device that is operated by suitable means, for example electricity, propane fuel, or the like. For ease of operation, the heater tubes 68 can be joined by a manifold assembly, generally illustrated by 69 in FIG. 6. In another heater embodiment, a simplified heater assembly construction can be used that eliminates the heater tubes 68. The manifold 69 simply feeds the heated air into the elongated passageways 71 between the bin 22 and the framing of the device, as generally illustrated in FIG. 5.

The apparatus and method of the present invention permit the handling of large loads of manure material without requiring especially high sidewalls inasmuch as the bin 22 includes plurality of unloading augers that are placed side by side in the wide-mouth bottom of the bin 22. Volume and feeding efficiency are further enhanced by providing sidewalls that are unusually steep for these types of devices and while explicitly avoiding a v-shaped tank or bin configuration that has been found to compound the bridging problem. The plurality of auger assemblies, preferably in a dual auger construction, allows the manure spreader 21 to utilize a wide bottom section in order to provide added volume without needing to increase the height of the bin 22. Also, manure materials of various consistencies can be handled. Usually, when especially sticky manures are spread, the gate 33 should be fully opened to take full advantage of the interaction of the fan blades 59 and the counter-rotating feed augers according to this invention.

While particular embodiments of the invention have been shown and described, it will be appreciated by those skilled in the art that changes and modifications may be made therein without departing from the invention in its broader aspects; and, therefore, the aim in the appended claims is to cover all such changes and modifications as fall within the true spirit and scope of the invention.

I claim:

1. A manure spreader for distributing any of a variety of manure materials having varying consistencies, comprising:

a bin mounted onto a frame having ground engaging wheels, said bin having an end wall and an opening ' therethrough;

at least two auger assemblies longitudinally mounted within the bin in side-by-side relationship, said auger assemblies each have an outfeed end at a longitudinal end thereof that is adjacent to and closely spaced from said end wall opening, and said auger assemblies are counter-rotating with respect to each other and include means for feeding manure materials in a feed direction longitudinally generally along the auger assemblies;

a generally vertically oriented expeller assembly positioned over said end wall opening, said expeller assembly is closely spaced form said outfeed ends of the auger assemblies, said expeller assembly having edge means for receiving manure materials directly from each longitudinal outfeed end of the auger assemblies and for distributing such manure material onto a field or the like, said expeller assembly means for receiving a manure materials engages manure materials fed through said end wall opening;

drive means for counter-rotating said auger assemblies and for rotating said receiving and distributing means of the expeller assembly;

each auger assembly includes at least two different auger profiles, one such auger profile including relatively shallow flights and a broad auger shaft, and the other such auger profile including deep flights that are substantially deeper than said shallow flights and a narrow auger shaft that is smaller in overall cross-section than said broad auger shaft; and each said outfeed end of each said auger assembly is positioned at a longitudinal end of said deep flight auger profile that is closely spaced from said vertically oriented expeller assembly, each said deep flight auger profile longitudinal end has edge means for engaging and moving manure materials into and through said end wall opening, each said edge means of the deep flight auger profile rotates within a generally vertical plane that is substantially parallel to said end wall opening, said receiving means of the expeller assembly includes means for sweeping said end wall opening in a direction generally perpendicular to the feed direction of said auger assemblies, said sweeping means includes a rigidly mounted blade having an edge that is closely spaced from said end wall opening, and said blade edge rotates within a generally vertical plane that is substantially parallel to said end wall opening.

2. The manure spreader according to claim 1, wherein said expeller assembly is positioned generally perpendicularly with respect to said auger assemblies, and said receiving and distributing means of the expeller assembly expels the manure material in a generally broad pattern from a side of the manure spreader.

3. The manure spreader according to claim 1, wherein said opening is closeable and openable to varying extents.

4. The manure spreader according to claim 1, wherein said drive means rotates said auger assemblies at a slow speed relative to the speed at which said receiving and distributing means of the expeller assembly is rotated.

5. The manure spreader according to claim 1, wherein each auger assembly includes means for rotatably mounting safe to generally opposing end walls of the bin, at least one of said mounting means including a substantially cylindrically shaped polymeric bearing member.

6. The manure spreader according to claim 1, wherein said counter-rotating auger assemblies comprise dual augers, each of which rotates in a direction toward the other.

7. The manure spreader according to claim 1, wherein said bin has sidewalls that are substantially steep and that have portions which are generally vertical.

8. The manure spreader according to claim 1, wherein said counter-rotating auger assemblies comprise dual augers, and said bin has a bottom wall including elongated members that generally conform to the bottom profile of said dual augers.

9. The manure spreader according to claim 1, wherein said bin is generally w-shaped in transverse cross-section.

10. The manure spreader according to claim 1, wherein said different auger profiles of the auger assemblies provide a stepped longitudinal configuration.

11. The manure spreader according to claim 1, wherein said other auger profile having deep flights further includes a secondary deep auger flight mounted approximately 180° out of phase from said deep auger flights.

12. The manure spreader according to claim 11, wherein said secondary deep auger flight has a feed end that has an edge which is generally co-planar with said edge means of the feed end of the deep flight auger profile of each auger assembly.

13. The manure spreader according to claim 1, wherein said different auger profiles have generally continuous outwardly extending outer profiles.

14. The manure spreader according to claim 1, wherein said expeller assembly means for receiving and distributing manure material includes a fan assembly having a plurality of rigidly mounted blades that rotate with a generally horizontally oriented shaft in communication with said drive means, each of said blades having a face extending longitudinally with respect to the bin and generally parallel to the generally horizontally oriented shaft of the expeller assembly.

15. The manure spreader according to claim 14, wherein said opening is closeable and openable to varying extents, and wherein said blade is sized and mounted in order to sweep along said opening.

16. The manure spreader according to claim 1, further including heating means including a manifold for directing heated air into longitudinal channels generally along bottom portions of said bin.

17. The manure spreader according to claim 1, wherein said counter-rotating auger assemblies have respective angular directions of rotation that are generally away from each other and generally toward respective sidewalls of said bin.

18. The manure spreader according to claim 1, wherein said counter-rotating auger assemblies have respective angular directions of rotation that are generally toward one another.

19. A method for distributing any of a variety of manure materials having varying consistencies, comprising:

depositing a supply of manure material into a translatable bin having a wide-mouth configuration and an end wall with an opening therethrough;

augering said manure material within the bin longitudinally along at least two side-by-side auger assemblies therewithin, said augering including moving said manure material in a feed direction flow by counter-rotating action imparted thereto by the auger assemblies;

said augering including stepping said feed direction flow from a shallow auger flight pathway to a deep auger flight pathway, said feed direction flow form the deep auger flight pathway being directly into and through the end wall opening and directly into and closely spaced from a generally vertically oriented expeller assembly; and receiving said feed direction flow from the deep auger flight pathway and distributing same with the expeller assembly, said receiving step including wiping substantially the entire bin end wall opening with a plurality of blades of the expeller assembly.

20. The method according to claim 19, wherein said supply of manure material is a sticky semi-solid manure material.

21. The method according to claim 19, wherein said augering procedure is carried out at a speed substantially slower than the speed of said distributing step.

22. The method according to claim 19, wherein said procedure of stepping said feed direction flow loosens the manure material prior to said receiving step.

23. The method according to claim 19, wherein said counter-rotating action of the auger assemblies is one in which the manure material is moved generally between the auger assemblies.

24. The method according to claim 19, wherein said counter-rotating action of the auger assemblies is one in which the manure material is moved generally toward the sidewalls of the bin.

* * * * *

UNITED STATES PATENT AND TRADEMARK OFFICE
CERTIFICATE OF CORRECTION

PATENT NO. : 4,801,085

DATED : January 31, 1989

INVENTOR(S) : Thomas R. Fischer

It is certified that error appears in the above-identified patent and that said Letters Patent is hereby corrected as shown below:

```
    Col. 4, line 55, delete comma "," after "increases".
    Col. 6, line 29, insert --a-- after "includes"; line 37,
delete colon ":" after "bottom"; line 59, delete apostrophe " ' "
before "therethrough;".
    Col. 7, line 3, "form" should read --from--; line 9, after
"receiving" delete "a"; line 59, "safe" should read --same--.
```

Signed and Sealed this

Twenty-ninth Day of August, 1989

Attest:

DONALD J. QUIGG

*Attesting Officer*     *Commissioner of Patents and Trademarks*